Dec. 10, 1968  W. C. CONKLING ET AL  3,416,030
NAVIGATIONAL LANTERN SYSTEM AND LAMP CHANGER
Filed June 16, 1966  8 Sheets-Sheet 2
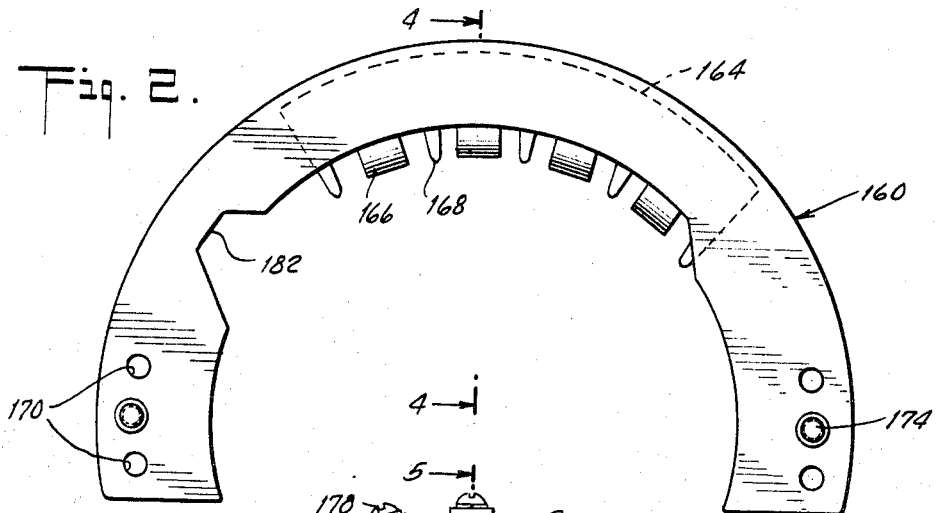
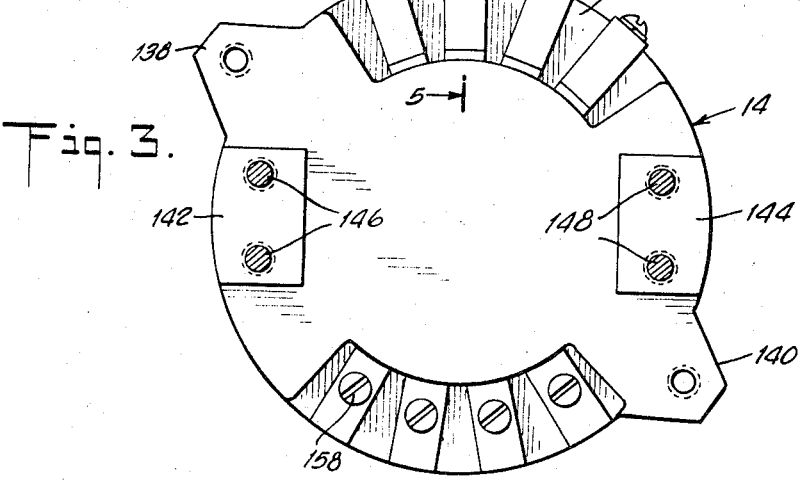
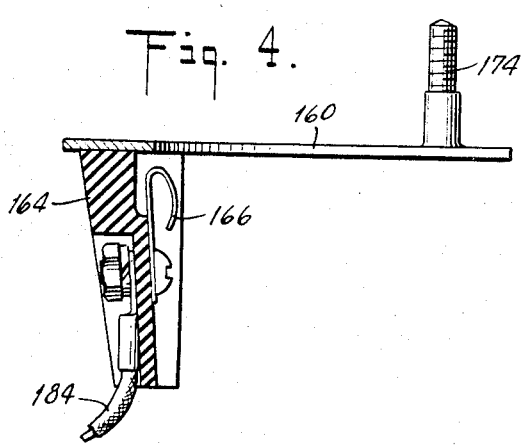
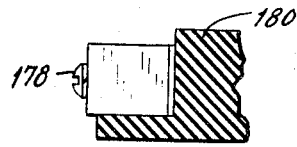

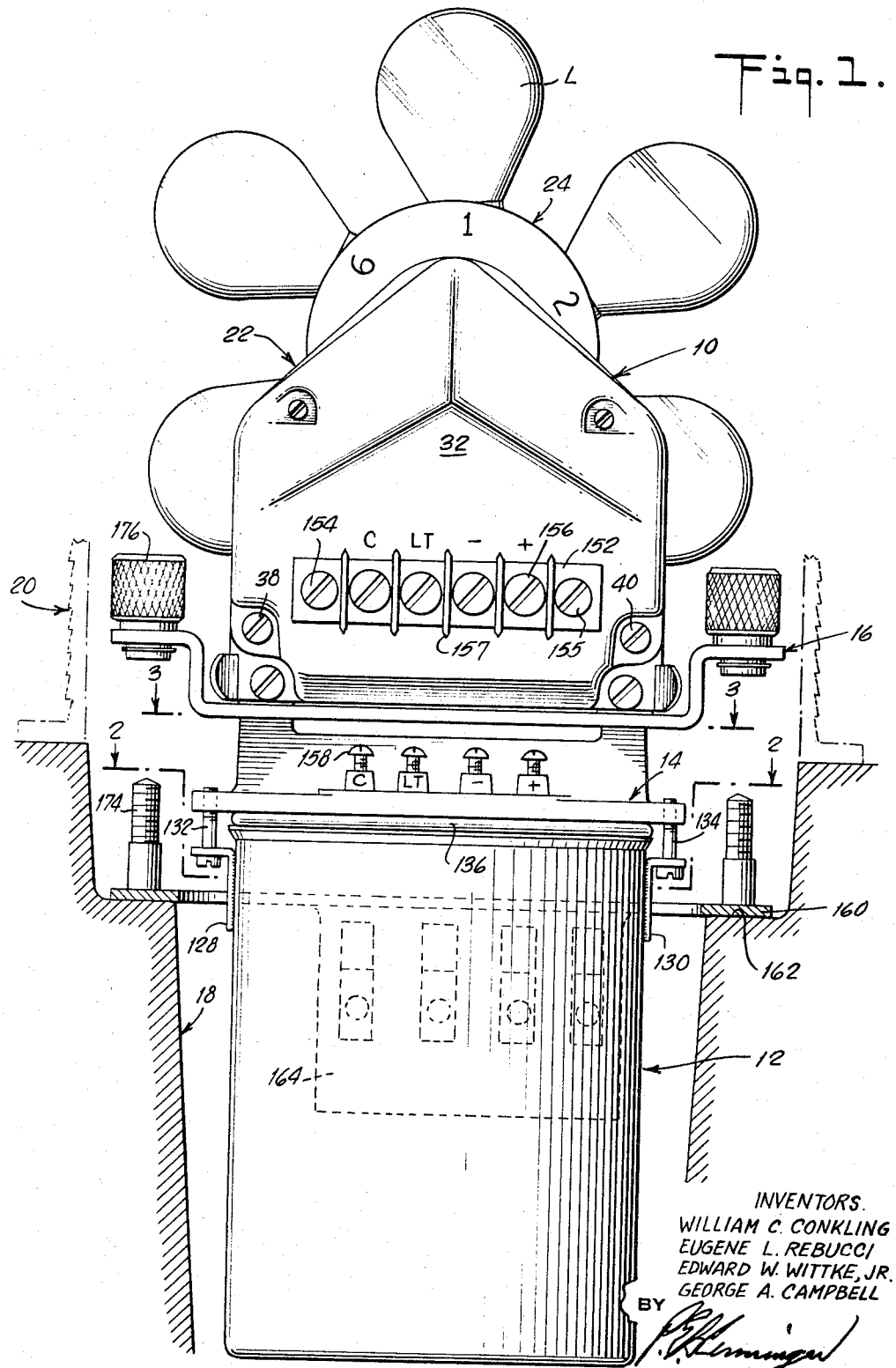

Dec. 10, 1968 W. C. CONKLING ET AL 3,416,030
NAVIGATIONAL LANTERN SYSTEM AND LAMP CHANGER
Filed June 16, 1966 8 Sheets-Sheet 3

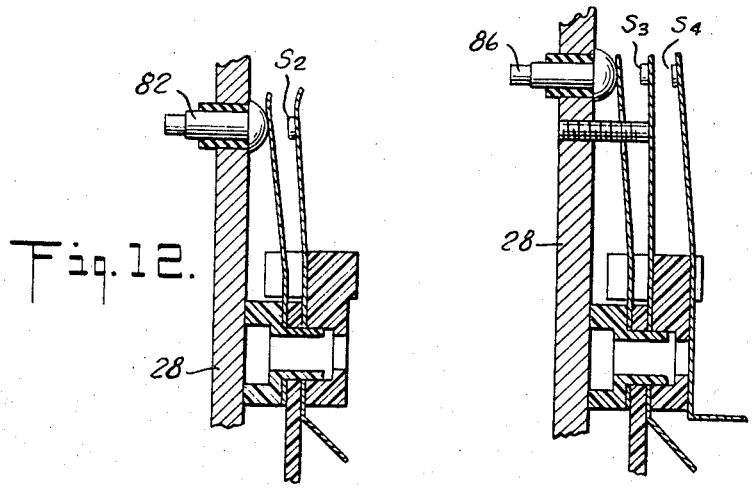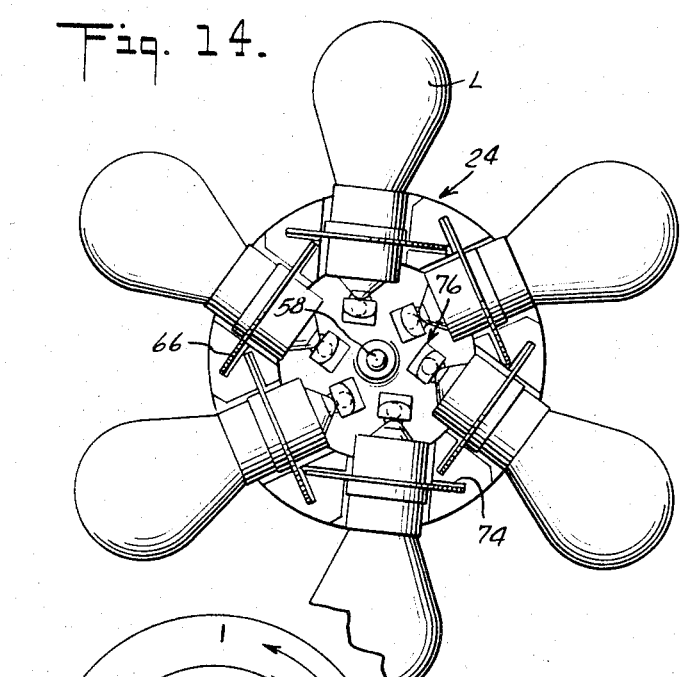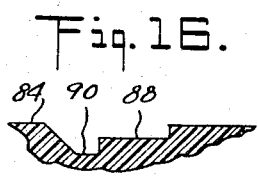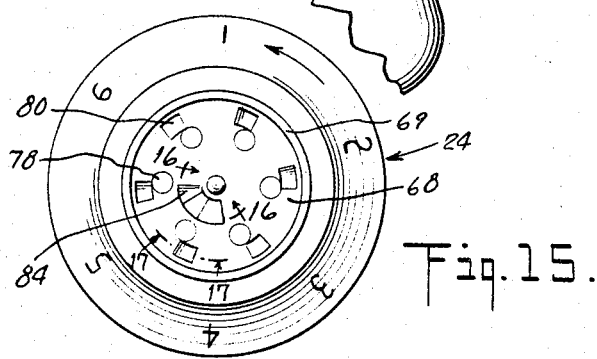

United States Patent Office 3,416,030
Patented Dec. 10, 1968

3,416,030
NAVIGATIONAL LANTERN SYSTEM AND
LAMP CHANGER
William Collins Conkling, Essex Fells, Eugene Leroy
Rebucci, Union City, Edward William Wittke, Jr., Westfield, and George Arthur Campbell, Pompton Plains,
N.J., assignors to Wallace & Tiernan Inc., East Orange,
N.J., a corporation of Delaware
Filed June 16, 1966, Ser. No. 557,997
19 Claims. (Cl. 315—89)

ABSTRACT OF THE DISCLOSURE

A navigational lantern system including a lamp changer comprising a pair of symmetrically enclosed component housing sections having a gabled and feathered geometry in the region of the lamp turret axis to insure against housing shadows cast upon the lantern lens by an energized lamp. The housing sections each has a plane face and the faces are arranged in spaced, confronting relation to each other to provide room between them for mounting and rotating a multi-lamp turret. The lamp turret has a shaft by which it is removably mounted for rotation in one of the housing face plates. The turret is adapted to receive lamps having a relatively large base flange and yet maintains the smallest possible turret turning radius by an interlocked or overlapped arrangement of flange receiving slots. The face of the other housing section has a motor-driven spring spider in contact with the lamp turret whereby the turret is driven from one lamp position to the next upon failure of the filament in operative position.

---

This invention relates to navigational light systems. In particular, the invention relates to improvements in automatic lamp changers of the general class disclosed in George A. Campbell United States Patent No. 3,146,375.

Navigation lights are regularly subjected to adverse climatic conditions, and they are frequently located in places to which access is difficult. It is, therefore, a primary requirement of such devices that they be as immune as possible to their environment and that they provide long periods of uninterrupted use without servicing attention. It has, therefore, been an aim of those responsible for the design of these aids to simplify the mechanism involved, yet at the same time increase the reliability thereof, particularly with a view toward reducing the time and frequency of servicing.

It is an important object of this invention to provide a lamp changer in which substantially all the mechanical and electrical components are completely enclosed.

It is a further object of this invention to provide a lamp changer having a geometry which eliminates shadows cast by the lamp upon the enclosing lens.

It is yet another object of this invention to construct a lamp changer of two symmetrical housing sections which provide between them space for a rotary lamp turret and which are separably connected to each other permitting relative separation to facilitate quick removal of the lamp turret.

It is a further object of this invention to provide a lamp turret having the smallest possible turning radius when loaded with lamps.

It is also an object of this invention to provide resilient means engaging the lamp turret for driving the same in rotation.

Finally, it is an object hereof to improve the electrical control circuit for the conventional turret drive motors to improve performance and reliability.

The objects of the invention are fulfilled in a practical manner by the mechanism disclosed herein by a lamp changer which comprises a pair of symmetrically enclosed component housing sections having a gabled and feathered geometry in the region of the lamp turret axis to insure against housing shadows cast upon the lantern lens by an energized lamp. The housing sections each has a plane face and these faces are arranged in spaced, confronting relation to each other to provide room between them for mounting and rotating a multi-lamp turret. The lamp turret has a shaft by which it is removably mounted for rotation in one of the housing face plates. The turret is adapted to receive lamps having a relatively large base flange and yet maintains the smallest possible turret turning radius by an interlocked or overlapped arrangement of flange receiving slots. The face of the other housing section has a motor-driven spring spider in contact with the lamp turret whereby the turret is driven from one lamp position to the next upon failure of the filament of the lamp in operative position. The two housing sections are held in their normal spaced operative position by a quick release latching mechanism which, when operated, permits separation of the housing sections and the release of the lamp turret therebetween so that the turret can be easily removed for re-lamping, as may be required.

The turret drive motor is under control of a very simple but highly reliable control circuit whose principal components are a magnetic reed switch in series with the filament of the lamp in operative position, a silicon controlled rectifier for transmitting current to the motor, and a transistor under control of the reed switch for normally holding the rectifier in the non-conducting state.

The several features of the invention will become clear when the following detailed description is read in light of the accompanying drawings, wherein like reference numerals indicate like parts, and in which:

FIG. 2 is a plan view of a semi-circular contact ring taken on line 2—2 of FIG. 1;

FIG. 3 is a plan view of an adapter block taken on line 3—3 of FIG. 1;

FIG. 4 is a fragmentary cross-section view of the semi-circular contact ring taken on line 4—4 of FIG. 2;

FIG. 5 is a fragmentary cross-sectional view of the adapter block taken on line 5—5 of FIG. 3;

FIG. 12 is a cross-sectional view of an electrical contact mechanism taken on line 12—12 of FIG. 11;

FIG. 13 is a cross-sectional view of an electrical contact arrangement taken on line 13—13 of FIG. 11;

FIG. 14 is an elevational view of the lamp changer turret with lamps mounted therein, the view showing the inner face of the turret;

FIG. 15 is an elevational view of the lamp turret of FIG. 14 looking toward the outer face thereof;

FIG. 16 is a fragmentary sectional view on line 16—16 of FIG. 15, showing a contact control cam surface;

FIG. 17 is a fragmentary sectional view on line 17—17 of FIG. 15, showing a second contact control cam surface; and FIG. 18 is a schematic diagram of an electrical control circuit used in the lamp changer.

Figure 6:
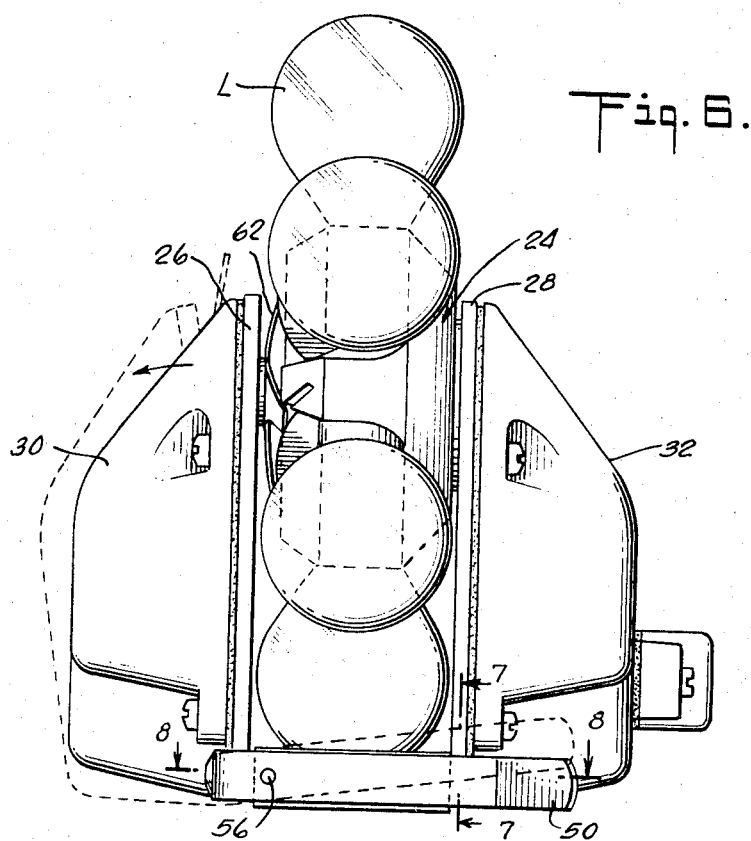
FIG. 6 is a side elevational view of a lamp changer comprising a unique component of the light system unit of FIG. 1, showing in dotted lines the lamp turret release position of a housing element of the lamp changer.

The light system unit with which this invention is concerned is composed of a lamp changer 10, a control module 12, an adapter block 14 which serves as a closure for the control module 12, and a mounting bar 16 connected between the lamp changer 10 and the adapter block 14.

The light system unit is adapted for mounting in a lantern base 18 such that the lamp in normal operative position is above the top surface of the lantern base. A lens 20 is mounted on the upper surface of the lantern base and surrounds and encloses the upper portion of the lamp changer.

Since this invention concerns itself primarily with the lamp changer 10, an immediate description of this component of the sytem is indicated. For this purpose, reference is made to FIGS. 1 and 9 in respect to which it can be explained that the lamp changer consists of a two-part housing 22 which encloses control components and supports a lamp turret 24. The housing 22 is made up of a first component face plate 26, an interconnected second component face plate 28 and first and second closure shells 30 and 32, respectively.

Figure 9:
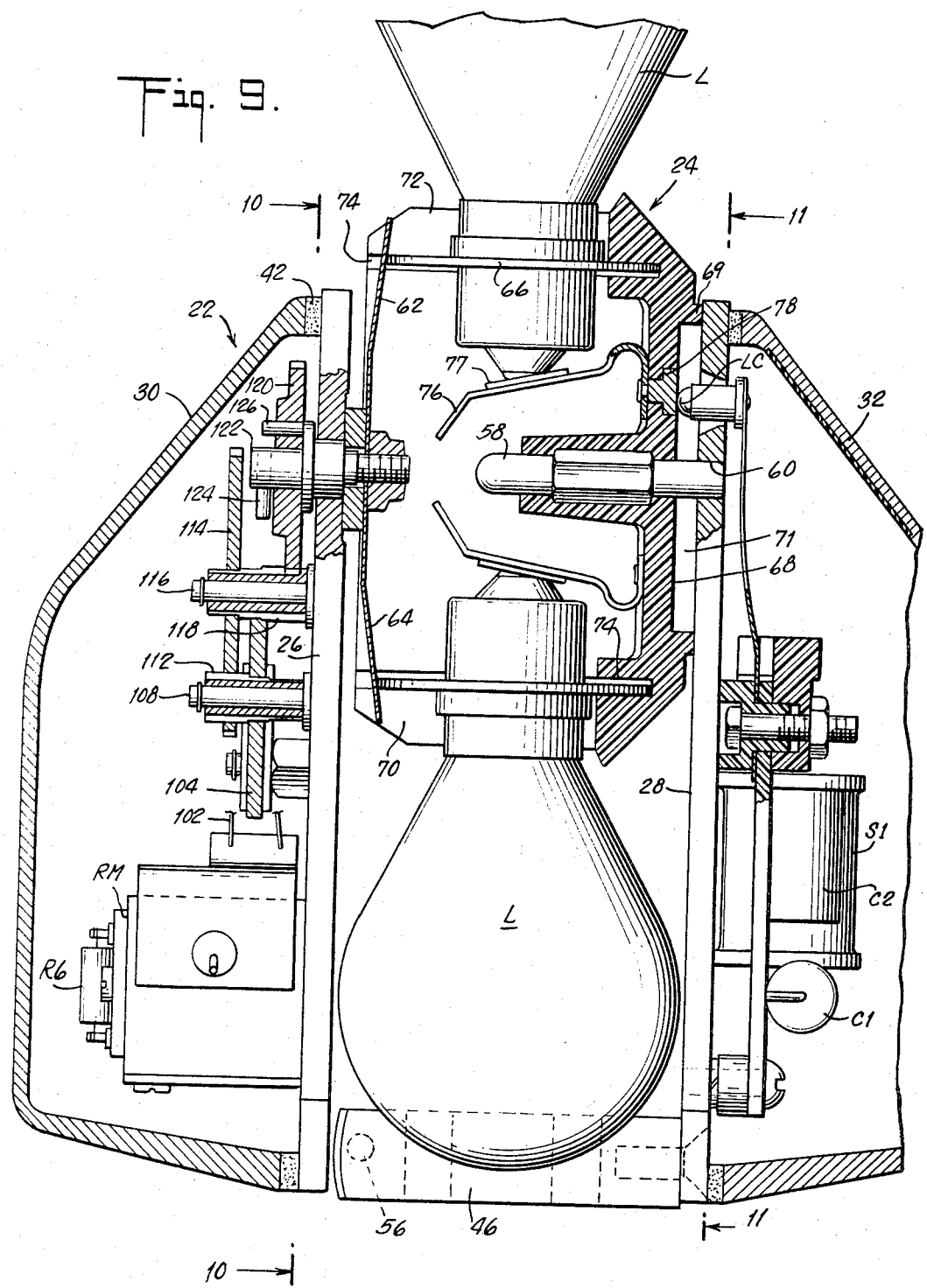
FIG. 9 is a vertical sectional view through the lamp changer of FIG. 6, parts thereof being shown in full line.
Figure 10:
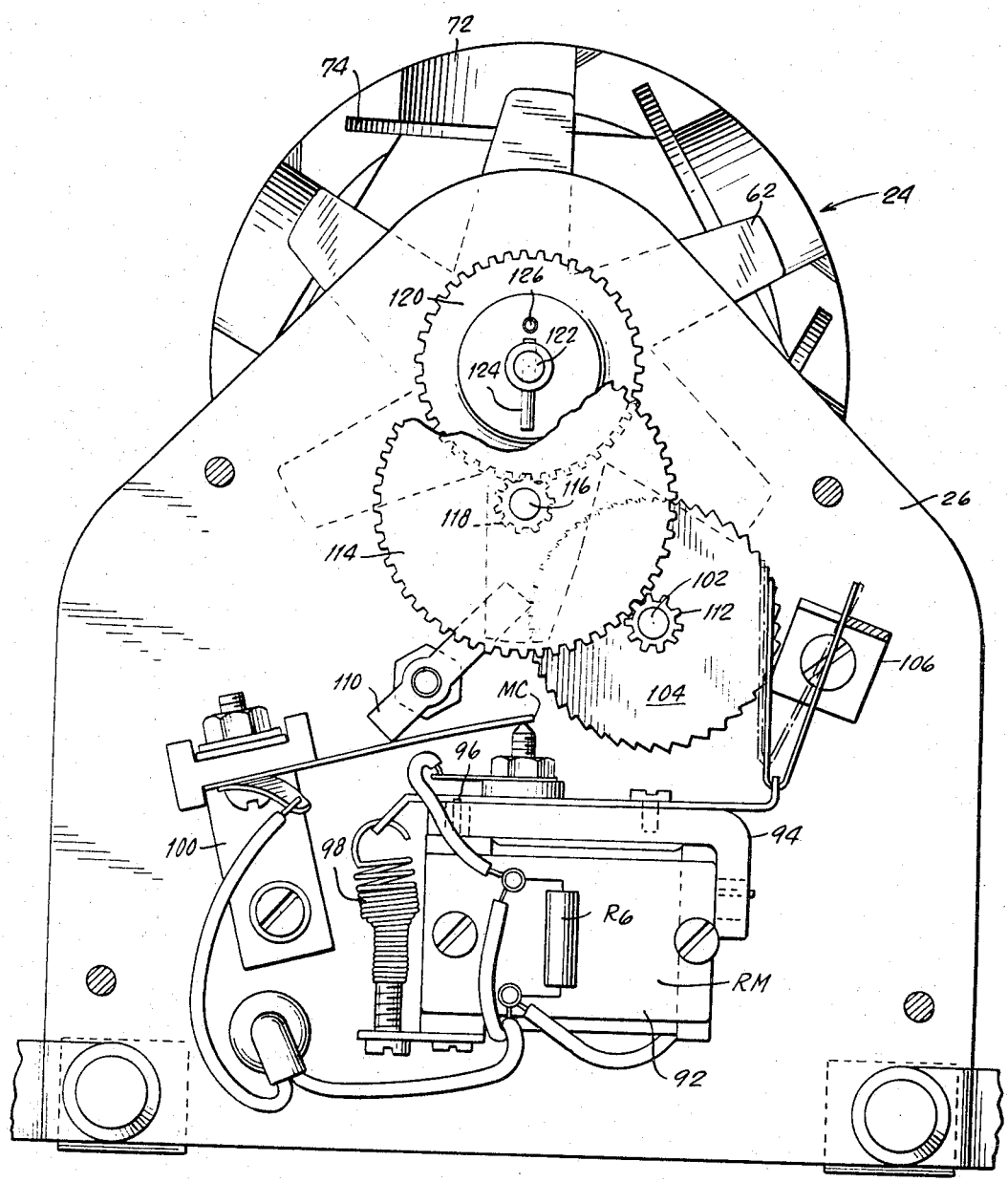
FIG. 10 is an elevational view of the lamp changer of FIG. 9, taken on line 10—10 thereof, showing the mechanism mounted on a component face plate of the housing structure.
Figure 11:
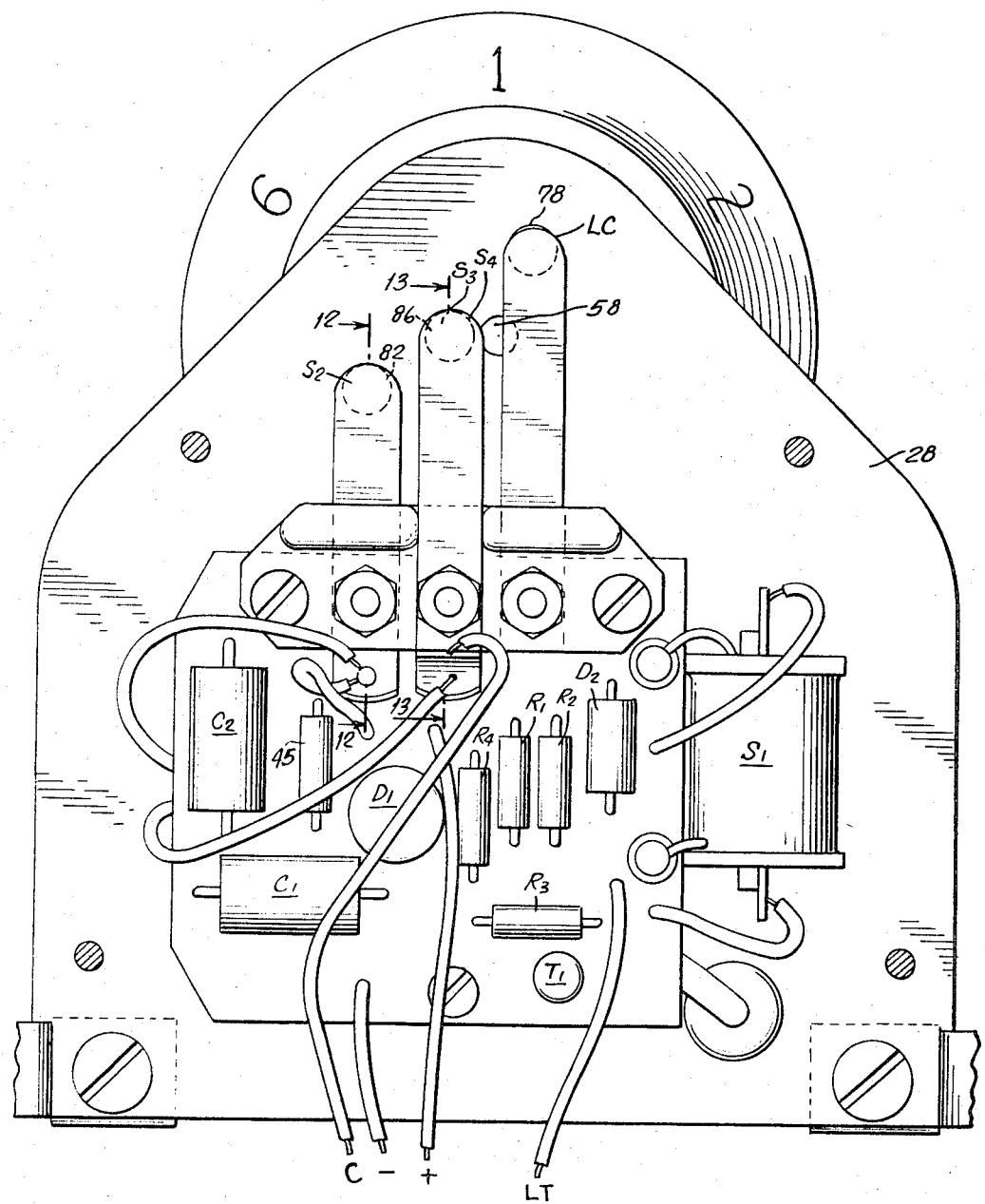
FIG. 11 is an elevational view of the lamp changer of FIG. 9, taken on line 11—11 thereof, showing control circuit components mounted on a second component face plate of the housing structure.
Figure 1B:
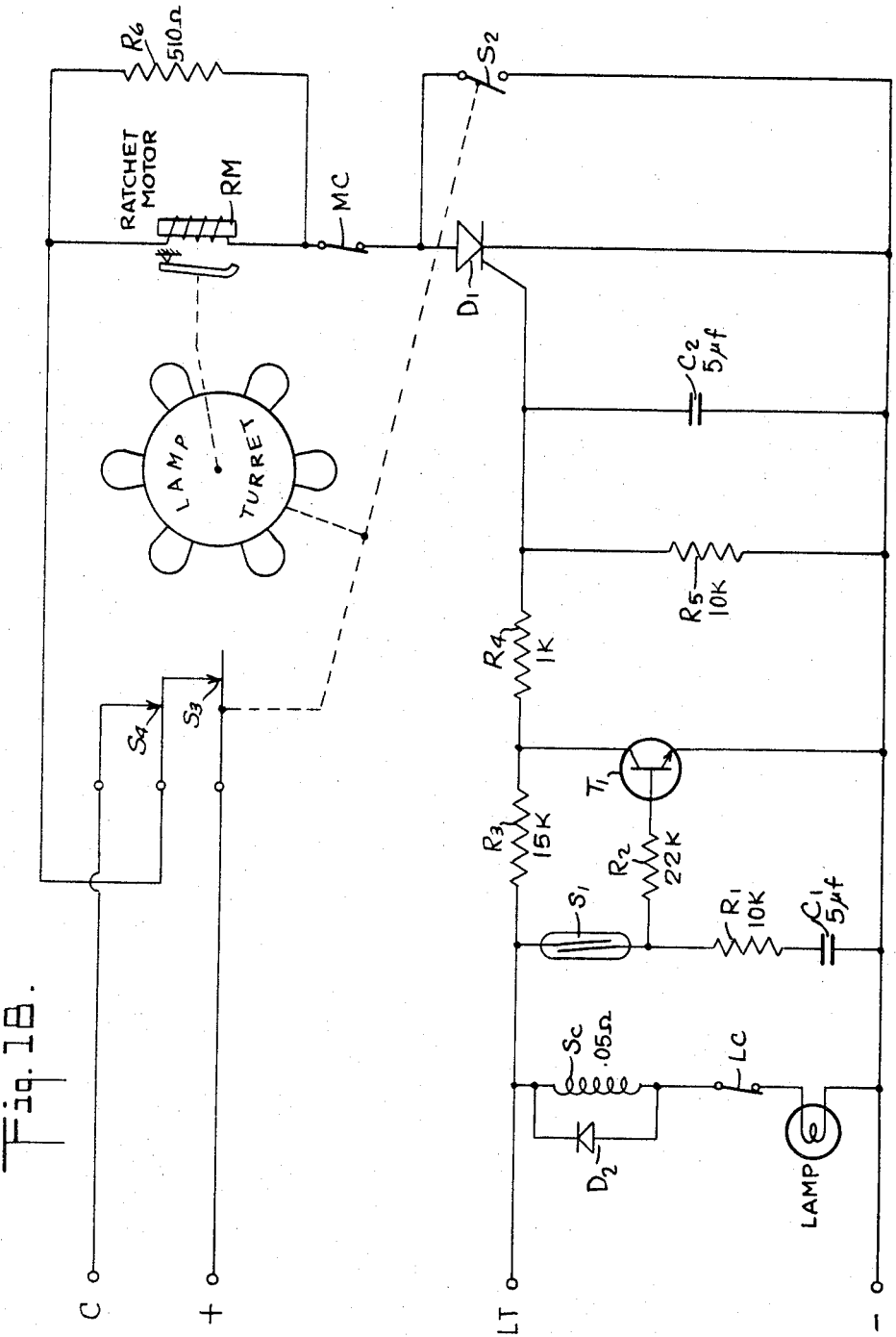
FIGURE 1 is a front elevational view of a light system unit partially inserted into a lantern base, parts of the latter being shown in cross-section.

By continued inspection of FIG. 1 and also by reference to FIGS. 10 and 11, it can be seen that the component face plates 26 and 28 are gabled at their upper ends, i.e., the edges thereof are angularly disposed to form a somewhat conical structure in which the lamp turret 24 is mounted for rotation. The closure shells 30 and 32 are dished structures which are gabled to correspond in outline to their respective component plates and feathered inwardly toward the component plates at their upper ends. As shown in FIG. 1, the closure shells 30 and 32 are tightly attached to their respective component plates by means of screws 34, 36, 38 and 40. Sealing gaskets 42 (FIG. 9) are interposed between the component face plates and their closure shells. The shape of the housing insures that no part of the lamp changer structure will cast a shadow on the lens and that the lens will be free of all shadows due to the structure of the lamp changer itself. Moreover, the geometry of the housing provides adequate space for components and is physically strong and relatively immune to rough handling as the covers enclose the mechanical and electrical component and protect the turret from most angles.

Figure 7:
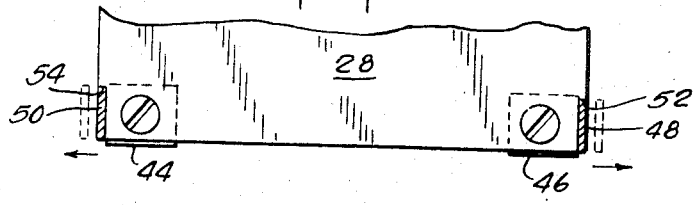
FIG. 7 is a fragmentary sectional view on line 7—7 of FIG. 6.
Figure 8:
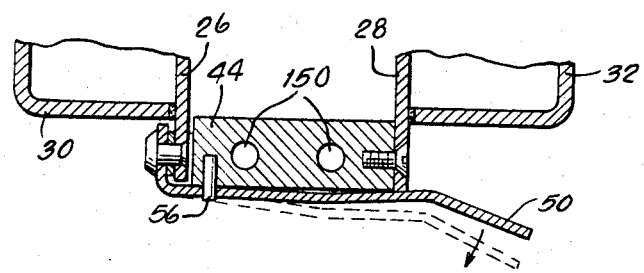
FIG. 8 is a fragmentary sectional view on line 8—8 of FIG. 6.

The lamp turret 24 is easily separated from the housing 22 to facilitate lamp replacement. To permit the ready removal of the lamp turret, the housing sections are interconnected at their bottom to permit a separation of the two sections whereby the lamp turret is freed for removal from the housing. FIGS. 6, 7 and 8 best illustrate the manner in which the housing sections are interconnected. The section comprising the component face plate 28 and its closure shell 32 is attached to a pair of base blocks 44 and 46 at the lower opposite corners of the housing section. Rigidly attached to the housing section comprising the component face plate 26 and its closure shell 30 are a pair of release levers 48 and 50. These levers normally rest under respective latch shoulders 52 and 54 formed at the lower opposite edges of the component plate 28. The release levers are, however, sufficiently resilient to permit lateral flexing into the dotted line position of FIG. 7, whereby they are freed of the shoulders 52 and 54. Each of the levers is connected to its respective base block by a pivot pin 56, as shown in FIG. 8. It can be seen, therefore, that when the release levers are moved outwardly to free them of their respective latch shoulders 52 and 54, the housing section so pivoted on the base blocks can move outwardly as shown by dotted lines in FIG. 6. Such movement frees the lamp turret 24 for ready removal from the housing.

Reverting to FIG. 9, it can be seen that the lamp turret has a shaft 58 at its axis upon which it is adapted to rotate. The turret shaft 58 is rotatably supported in a bearing aperture 60 formed in the component plate 28. The lamp turret is driven in rotation by a turret driving spring spider 62. The shaft 60 centers the turret in the component plate 28, and the spring spider 62 holds it in position. The spring spider 62 is a resilient metallic structure having extending radially from its axis a plurality of spring fingers 64 one of which is in contact with the base of each of the lamps carried by the turret. The turret driving spring spider 62 fulfills several important functions. The spring fingers 64 serve as an electrical contact with each of the six lamp flanges. The spring force is transmitted through the base of the lamps to the face of the lamp turret, thus providing the force which effects a seal between the lamp turret and the component plate 28. It also facilitates turret removal in that when the release levers 52 and 54 are disengaged, it causes the two sides of the housing to spring apart as shown in FIG. 7, thus leaving the turret clear for removal from the housing. Moreover, the spring spider also transmits motor torque to the turret.

In the lamp turret structures of conventional lamp changers, the lamps are mounted in a rotary lamp turret having surfaces describing a hexagon. A maximum radius is thus required for the rotation of the turret within its enclosing lens. Such radius is sometimes unavailable as, for example, when it is attempted to use S-11 lamps and a conventional turret in the 155 mm. acrylic lens used in many present day navigational lights. An apparent solution to this difficulty is a reduction in the number of lamp mounting positions provided by the turret. A more satisfactory solution, however, as taught herein, is an arrangement of the lamps which mounts the lamps on a shorter radius and, therefore, requires no reduction in the number of lamps employed.

Navigational lighting systems to which this invention pertains ordinarily employ S-8 and S-11 lamps which have a large base including a base flange 66 of substantial diameter. This base flange must be accommodated by the lamp turret. This invention provides for the interlocking or overlapping of the base flanges of adjacent lamps thus conserving the space that is required for their mounting. The lamp turret and particularly the lamp mounting features thereof are best shown in FIGS. 9 and 14, wherein it is shown that the lamp turret is a one-piece plastic injection molding which has a web 68 and a generally cylindrical turret flange 70 (FIG. 9). Six lamp base apertures 72 are formed in the turret flange 70. The turret flange 70 is provided with slots 74 adapted to receive the lamp base flange 66. These slots overlap each other as shown in FIG. 14, thus reducing the radius of the mounting surfaces. The result of this mounting arrangement is that the lamps are no longer radially disposed in the turret, but are canted about 5° from the vertical when the lamp is in the operating position. This cant has a negligible effect on the light output in a lantern or range light system. The interlocking or overlapping base flanges allow the lamps to be drawn closer to the axis of the turret, reducing the turning radius. This, as suggested, is a departure from the normal practice of arranging the six lamp flanges to form a hexagon. A smaller turning radius is desirable not only in that it permits the use of six S-11 lamps in certain lantern lenses, but it also reduces the size of the lens cut-out required in range light applications. The reduced radius also reduces the overall height required of the lamp changer, leaving more lantern space for other components.

The opposite face of the lamp turret is shown in FIG. 15 and enlarged fragmentary details thereof are shown in FIGS. 16 and 17. As shown in FIG. 9, a resilient lamp base contact finger 76 is provided for each lamp. The outer surface of the contact fingers is embossed to provide upstanding ridges 77 which cut corrosion and dirt as the lamps are mounted into the turret. The contact fingers are connected to the web of the lamp turret by means of contact studs 78. The contact studs extend through the web of the turret where, upon rotation of the turret, they successively come into contact with a lamp contact LC which is in the control circuit, as shown in FIG. 18.

Associated with each of the lamp contacts LC in the same face of the lamp turret web are back contact cam surfaces 80. These cam surfaces, better shown in FIG. 17, are adapted to operate a back contact $S_2$ which is in the control circuit of FIG. 18 and which is also shown in FIG. 11. Details of the back contact $S_2$ are illustrated in FIG. 12, wherein it is shown that the contact $S_2$ is normally open but has associated therewith an operating pin 82 which is projected by the web of the lamp turret to close the contact as the turret rotates between lamp positions.

The outer face of the lamp turret web has also formed therein a camming surface 84 which is better shown in the enlarged fragment of FIG. 16. This camming surface is adapted to operate a pair of contacts $S_3$ and $S_4$, the details of which are shown in FIG. 13, the position of which is shown in FIG. 11. The camming surface 84 is adapted to engage an operating pin 86 mounted in the component plate 28. The operating pin 86 is normally projected by the flush surface of the lamp turret web such that the contacts $S_3$ and $S_4$ are normally closed. The camming surface 84 is formed at the approach to the sixth lamp position and becomes operative as the sixth lamp is being brought into operative position. By reference to FIG. 16, it will be evident that the camming surface 84 provides working areas at two levels 88 and 90. As the operating pin 86 is permitted to move outwardly by the camming surface 88, the contact $S_4$ will open. The opening of this contact can be used for any desired control purpose. When the operating pin 86 is permitted further outward movement by the deeper recess 90, the contact $S_3$ will open. This contact is a one-turn, shut-off contact which disables the turret operating circuit and prevents continued rotation of the turret after the sixth lamp is in position. The circuit operation will be described in greater detail in respect to FIG. 18.

Finally, it should be noted that the web 68 of the lamp turret is defined by an annular outwardly projecting sealing ridge 69 extending entirely about the web and forming therewith a dished configuration. When the sealing ridge 69 is yieldingly urged into sealing contact with the outer surface of the confronting face plate 26 by the spring spider 62, it forms therewith an enclosed chamber 71.

The lamp turret is driven from one lamp position to another, upon failure of the lamp in operative position, by a ratchet motor RM which, together with the necessary drive gear, is mounted on the component plate 26, as best shown in FIGS. 9 and 10. The major components of the control circuit are mounted on the component plate 28, as best shown in FIGS. 9 and 11.

The ratchet motor RM consists of a coil 92 and an armature 94 pivoted to the motor frame at one end 96. The armature 94 is normally biased into an open position by means of an armature return spring 98. A motor contact MC through which the ratchet motor circuit is established is carried by a bracket 100 attached to the component plate 26. The armature 94 operates a ratchet drive wire 102 as the armature oscillates on its pivot 96. This wire engages the teeth of a ratchet wheel 104 and is stabilized in its movement by a guide bracket 106. Thus, as the ratchet motor coil oscillates its armature, the ratchet drive wire will rotate the ratchet wheel 104 which is mounted for rotation on a stud shaft 108 extending from the outer face of the component plate 26. Retrograde motion of the ratchet wheel is prevented by a ratchet dog 110, one end of which engages the teeth of the ratchet wheel while the other end is in engagement with the motor contact spring MC.

Rotating with the ratchet wheel 104 is a drive pinion 112 operating in contact with the teeth of an intermediate gear wheel 114. This gear wheel 114 is mounted for rotation on a stud shaft 116 extending outwardly from the component plate 26. Also in rotation with the intermediate gear wheel 114 is an intermediate pinion 118 which is engaged with the teeth of a turret drive gear 120 which is free for rotation on the spider drive shaft 122. The spider drive shaft 122 has a drive pin 124 extending radially therefrom at the face of the turret drive gear 120. Projecting outwardly from the face of the turret drive gear in an axial direction is a drive stud 126 adapted, during rotation of the turret drive gear 120, to contact the drive pin 124 and thus rotate the spider drive shaft 122. The spider drive shaft 116 extends through the component plate 26 and has affixed thereto the turret driving spring spider 62 which has been previously described. It can now be seen that as the ratchet motor RM is energized, a driving force will be transmitted therefrom, through the gear arrangement just described, and to the turret drive spring spider 62, such that the lamp turret 24 is rotated. It will be shown in reference to the control circuit of FIG. 18 that the ratchet motor RM is controlled to advance the lamp turret one lamp position at a time whenever the filament of the lamp in operative position fails to pass current therethrough, as in the case when the lamp is burned out or the filament thereof otherwise becomes defective.

As to be explained in connection with the control circuit of FIG. 18, the principal components of which comprise a magnetic reed switch $S_1$, a transistor $T_1$, and a silicon-controlled rectifier $D_1$, the control embodies substantial improvements over similar conventional control circuits. The reed switch $S_1$ is enclosed within a series coil SC which is in series with the normally closed lamp contact LC and the filament of the lamp in operative position. So long as the lamp filament is integral, the circuit remains inoperative for then the reed switch $S_1$ is in control of the circuit which operates as follows: upon application of LT voltage, the reed switch will be closed. When this switch is closed, it allows base current to flow into the transistor $T_1$, switching the transistor to the conductive state in the saturated condition. The transistor $T_1$ now holds the gate of the silicon-controlled rectifier $D_1$ at essentially ground potential. The rectifier $D_1$ thus will not conduct and the ratchet motor RM will not be energized. A condenser $C_2$ holds the gate of the rectifier $D_1$ during the time it takes for the transistor $T_1$ to become conductive after application of LT voltage. A condenser $C_1$ stores a charge during the application of LT voltage which is used to keep the transistor $T_1$ conducting for a short time after the reed switch $S_1$ opens, thus shorting out any voltage spikes occurring immediately after the LT period. In the event of a broken lamp filament, the reed switch $S_1$ will open and current will thereby flow into the gate of the rectifier $D_1$ causing it to conduct and thereby supply energizing power to the ratchet motor RM. With each step of the ratchet motor, the circuit through the rectifier $D_1$ is opened. Thus, the rectifier $D_1$ will be drawn into the blocking state if gate current is not present. The ratchet motor RM is uniquely compatible with the silicon-controlled rectifier $D_1$ in that the filament circuit is sampled at every step.

The several camming surfaces of the lamp turret 24 have been heretofore described, particularly with reference to the operation of the one-turn shut-off $S_3$ and the back contact $S_2$. The back conatct which is closed during rotation of the lamp turret from one lamp position to the next, allows the ratchet motor RM to run steadily between lamp changes independent of the flash cycle to obtain faster changing.

It should also be pointed out that the motor stepping contact MC is a two-position stepping contact which increases the motor's operating voltage range and it is so arranged as to provide ease of adjustment and more reliability in operation of the motor in that it no longer depends on the adjustment of an interacting spring and inertia system. As explained, the motor contact MC is actuated by the ratchet dog 110. When the motor RM is first energized and the armature begins its downward motion, the contact MC is maintained by the dog which presses down on the contact spring as the ratchet wheel 104 rotates. When the ratchet dog 110 passes over a ratchet wheel tooth, the contact is broken and the contact spring assumes a position some distance above the point at which the break occurred. The armature return spring 98 now accelerates the armature 94 upwardly. Since the contact MC cannot be made again until the armature has moved some distance upwardly, the return spring has time to build up the armature's velocity to insure that the armature will continue upwardly to the limit of its travel.

The components of the motor control circuit which have just been described are mounted on the component plate 28. Electrical connection between the control circuit and the motor in the opposite housing section is made by way of a waterproof insulated cable. FIGS. 1 through 5 illustrate how the remaining necessary electrical connections are made between the lamp changer 10 and the control module 12, as well as the manner in which the light system unit is mounted in the lantern base 18.

The control module 12 is a water-tight metal can which has a pair of brackets 128 and 130 welded to the top thereof. These brackets have clearance holes in the laterally extending flanges thereof to accommodate screws 132 and 134 adapted to engage tapped holes in the adapter block 14 whereby the control module and the adapter block are connected together. The adapter block 14 serves as a closure for the control module and as means for effecting electrical connections. A sealing gasket 136 is interposed between the open mouth of the control module can and the lower face of the adapter block 14.

As best shown in FIG. 3, the adapter block has a pair of polarizing keys and control module attachment points 138 and 140 in which the tapped connecting screw holes are formed. It also has a pair of lamp changer and mounting bar attaching pads 142 and 144 in the upper face thereof whereby the lamp changer 10 and the mounting bar 16 can be connected into the system unit. The attaching pads have pairs of blind tapped holes 146 and 148 opening through the upper face thereof for receiving screws.

In FIG. 8, it can be seen that the base blocks 44 and 46 at the bottom of the lamp changer have clearance holes 150 formed therein. These holes register with the tapped holes 146 and 148 in the adapter block. The mounting bar 16 has similar clearance holes in registration with those in the base blocks of the lamp changer and in the face of the adapter block. Therefore, when the mounting bar is placed in position on the adapter block and the lamp changer is placed in position thereon, screws can be passed through the registering holes to connect the control module, the lamp changer and the mounting bar as a unit.

The control module 12 ordinarily encloses electrical circuits, for example, flasher and timing circuits, with which this invention is not particularly concerned. However, since various circuits may be common to both the lamp changer and the control module, provision is made in the adapter block 14 for circuit interconnection. Thus, the lamp changer has on one face thereof an insulating strip 152 through which extend the several connecting screws 156. The strip 152 is attached to the cover 32 by means of screws 154 and 155. The connecting screws 156 are separated from each other by insulating barriers 157. Extending upwardly from the adapted block are a plurality of binding posts 158 which can be electrically connected to the screws 156, as may be required, by short lengths of insulated waterproofed wire.

The conventional battery power source (not shown) is located externally of the lantern base 18. This source is electrically connected to a semi-circular contact ring 160 mounted on and attached to a shoulder 162 formed near the mouth of the lantern base. This ring is best shown in FIGS. 2 and 4. By reference to FIGS. 2 and 4, it will be seen that the ring 160 has extending from its lower face a block of insulating material 164 onto which are attached a plurality of contact springs 166 which are separated from each other by insulating barriers 168. Clearance holes 170 at each end of the semi-circular contact ring provide means for screw fastening the semi-circular contact ring to the shoulder of the lantern base. Screw threaded studs 174 extend upwardly from the contact ring 160. These studs are engageable by threaded captive thumb nuts 176 (FIG. 1) at the extremities of the mounting bar 16. When the light system unit is fully seated in the lantern base and the captive thumb nuts 176 are screwed home on the studs 174, the light system unit will be fixed in its position within the lantern base 18. The position of the unit can be controlled by resort to washers or shims inserted under the contact ring 160 and held in place by studs passing through the clearance holes 170 by which the ring is secured to the lantern base. In adjusting the location of the unit it is important that the lamp filaments be at the vertical focal point of the lens.

A plurality of lantern contacts 178 are carried by an insulating block 180 at the diameter of the adapter block 14 which is opposite the binding posts 158. These lantern contacts are adapted to engage the contact springs 166 when the light system unit is properly seated in the lantern base. To insure the proper engagement of the lantern contacts 178 with the contact springs 166, the module attachment points 138 and 140 of the adapter block 14 also serve as polarizing keys adapted to engage in a complementary polarizing key 182 formed in the semi-circular contact ring 160. The several contacts 166 are connected with the power source within the lantern base by means of connectors 184.

It is evident from the foregoing that the objectives of the invention have been fulfilled in a manner which is both simple and effective. The described form of the invention comprises a preferred embodiment, and while a single embodiment has been shown and described, it is evident that the invention can be embodied in forms departing from the illustrative disclosure herein.

What is claimed is:

1. In a lamp changer for navigation aids, a first and a second housing section, said sections each having a substantially plane face plate, means releasably securing said sections in spaced relation with said plane face plates confronting each other providing therebetween room for a rotary lamp turret, a lamp turret having a bearing shaft extending axially from one face thereof within said space between said housing sections, said shaft extending into a bearing aperture in the face plate of one of said sections in rotative and freely removable relation thereto, means for mounting a plurality of lamps in said lamp turret, rotary means carried by the face plate of the other of said housing sections releasably engaging said turret, and means for driving said rotary means whereby said turret is rotated.

2. The arrangement of claim 1, wherein said housing sections each includes an outwardly dished closure shell attached to said face plates forming therewith enclosed component receiving chambers.

3. The arrangement of claim 2, in which the upper ends of said face plates and said closure shells are gabled and said closure shells in the gabled area are feathered inwardly toward their respective face plates to avoid casting shadows when an illuminated lamp is in operative position in said lamp changer.

4. The arrangement of claim 2, in which the inner face of the face plate of one of said chambers has attached thereto mechanical components comprising said turret driving means, and the inner face of the face plate of the other of said chambers has attached thereto mechanical components comprising said turret driving means, and the inner face of the face plate of the other of said chambers has attached thereto components of an electric control circuit.

5. The arrangement of claim 1, in which the means releasably securing said housing sections in spaced relation comprises a pair of base blocks secured to opposite edges at the bottom of one of said face plates, the opposite edges at the bottom of said second face plate being secured to a pair of resilient release levers, means pivoting said levers at the distal end of said base blocks, and latch means in said first face plate for normally holding said release levers and the housing section attached thereto against movement relative to said first named housing section.

6. The arrangement of claim 1, in which said lamp turret has a peripheral flange and is adapted to receive and hold lamps having a base flange of substantial circumference, and in which said lamp mounting means comprises a plurality of circumferentially spaced lamp base apertures in said turret flange, and overlapping lamp flange receiving slots intersecting said apertures, whereby lamps mounted in said turret are drawn closer to the axis of the turret thereby reducing the turning radius thereof.

7. The arrangement of claim 1, wherein said rotary means releasably engaging said turret comprises a metallic spring spider having spring fingers in number equal to the number of lamp mounting means, and having one of said spring fingers operatively associated with each of said lamp mounting means.

8. The arrangement of claim 1, in which said lamp turret includes a radial web whose outer face is in confronting relationship with the outer face of one of said face plates and having in the outer face thereof camming surfaces adapted to operate electrical contact operators extending through said confronting face plate into contact with said web.

9. The arrangement of claim 1, in which said lamp turret includes a radial web which is in confronting relationship with the outer face of one of said face plates, an annular outwardly projecting sealing ridge extending about said web and forming therewith a dished configuration, and means for yieldingly urging said sealing ridge into sealing contact with the outer face of said confronting face plate and forming therewith an enclosed chamber.

10. The arrangement of claim 9, in which said means for urging said sealing ridge into sealing contact with the outer face of said confronting face plate comprises said rotary means releasably engaging said turret.

11. The arrangement of claim 1, in which said means for driving said rotary means comprises a ratchet motor composed of a coil and a pivoted armature.

12. The arrangement of claim 11, in which said motor is controlled by a circuit delivering energizing current to said motor through a silicon-controlled rectifier, an electromagnetic reed switch in series with the filament of a lamp in operative position in said lamp turret, said reed switch being normally closed when current flows through the coil thereof and through the filament of a lamp in series therewith, said reed switch being connected in said control circuit to deliver current to the gate of said silicon-controlled rectifier when said switch is open thereby permitting said rectifier to deliver energizing current to said motor when said switch is opened by reason of failure of the lamp filament in series therewith.

13. The arrangement of claim 11, in which said motor is controlled by an electric circuit having therein a normally open switch, and means controlled by said turret during rotation thereof for closing said switch to maintain a motor energizing circuit.

14. A rotary lamp turret adapted to hold a plurality of lamps each having a base flange of substantial circumference and a mounting axis which passes perpendicularly through the center of the respective lamp flange, said turret having a peripheral flange of generally cylindrical form, overlapping lamp flange-receiving slots in said turret flange so formed as to hold the axes of said lamps in a substantially offset relationship to the axis of rotation of said turret, and means within said turret for establishing electrical contact with the base of lamps therein.

15. The structure of claim 14, in which said turret has a plurality of circumferentially spaced lamp base apertures and a slot intersects each of said apertures for receiving the respective lamp flanges.

16. In a lamp changer for navigational aids, a first and a separate second symmetrically shaped housing section, said sections each having a substantially plane face plate at one side thereof and a dished cover plate forming in each of said sections an enclosed chamber between said respective face plates and their respective cover plates, means securing said sections in spaced relation with said plane face plates confronting each other and providing therebetween room for a rotary lamp turret, a lamp turret having a bearing shaft extending axially from one face thereof within the space between said housing sections, said shaft extending into a bearing aperture in the face plate of one of said sections in rotative relation thereto, means for mounting a plurality of lamps in said lamp turret, rotary means carried by the face plate of the other of said housing sections adjacent the outer surface thereof in driving engagement with said turret, a ratchet motor composed of a coil and a pivoted armature, an energizing circuit for said ratchet motor having therein a normally open switch, and means controlled by said turret during rotation thereof for closing said switch to maintain a motor energizing circuit.

17. The arrangement of claim 16, in which said lamp turret includes a radial web which is in confronting relationship with the outer face of one of said face plates, an annular outwardly projecting sealing ridge extending about said web and forming therewith a dished configuration, and means for yieldingly urging said sealing ridge into sealing contact with the outer face of said confronting face plate and forming therewith an enclosed chamber.

18. The arrangement of claim 17, in which said means for urging said sealing ridge into sealing contact with the outer face of said confronting face plate comprises said rotary means engaging said turret.

19. In a lamp changer for navigational aids, a first and a separate second symmetrically shaped housing section, said sections each having a substantially plane face plate at one side thereof and a dished cover plate forming in each of said sections an enclosed chamber between said respective face plates and their respective cover plates, means securing said sections in spaced relation with said plane face plates confronting each other and providing therebetween room for a rotary lamp turret, a lamp turret having a bearing shaft extending axially from one face thereof within the space between said housing sections, said shaft extending into a bearing aperture in the face plate of one of said sections in rotative relation thereto, means for mounting a plurality of lamps in said lamp turret, circuit means for energizing a lamp in operative position, rotary means carried by the face plate of the other of said housing sections adjacent the outer surface thereof in driving engagement with said turret, a motor within said last-named housing section for driving said rotary means whereby said turret is rotated, a control circuit delivering energizing current to said motor through a silicon-controlled rectifier, a transformer, and a magnetic reed switch in a circuit parallel with said circuit energizing the filament of a lamp in operative position in said lamp turret, said reed switch being normally closed when current flows through the filament of said lamp, said reed switch being connected in said control circuit to subject said transformer to a biasing voltage to deliver cut-off current to said silicon-controlled rectifier when said switch is closed and to permit said rectifier to deliver energizing current to said motor when said switch is open by reason of failure of the filament of said lamp.

References Cited

UNITED STATES PATENTS

| | | | |
|---|---|---|---|
| 2,097,250 | 10/1937 | Keith | 240—37.1 X |
| 2,509,231 | 5/1950 | Hunter | 174—50.5 |
| 3,146,375 | 8/1964 | Campbell | 315—89 |

ROBERT SEGAL, *Primary Examiner.*

U.S. Cl. X.R.

240—37.1; 174—50.5